UNITED STATES PATENT OFFICE.

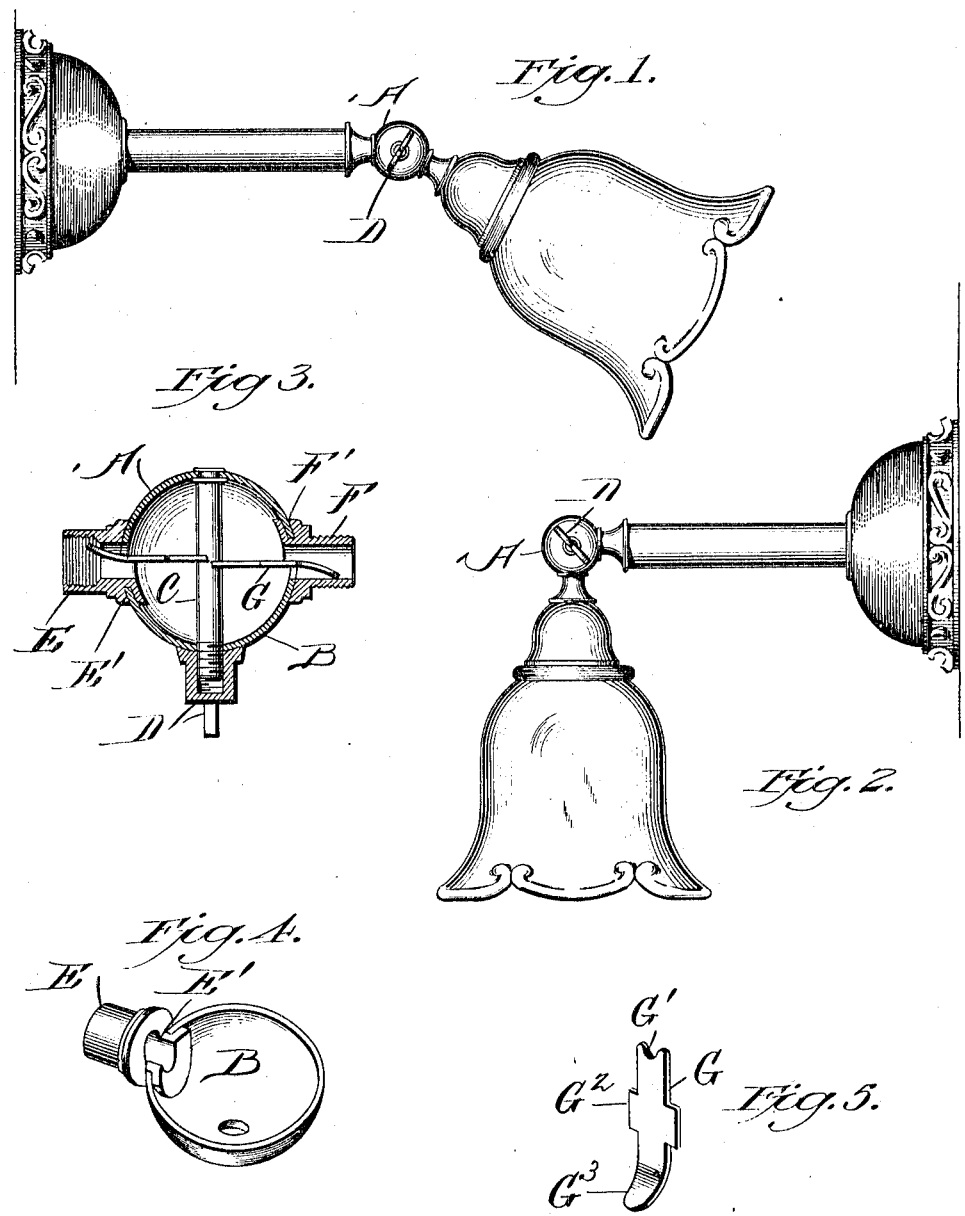

LAURITZ W. ANDERSEN, OF WATERBURY, CONNECTICUT, ASSIGNOR TO PLUME AND ATWOOD MANUFACTURING COMPANY, OF WATERBURY, CONNECTICUT, A CORPORATION OF CONNECTICUT.

BALL-JOINT.

1,080,405.

Specification of Letters Patent.

Patented Dec. 2, 1913.

Application filed September 6, 1913. Serial No. 788,418.

*To all whom it may concern:*

Be it known that I, LAURITZ W. ANDERSEN, a citizen of the United States, residing at Waterbury, in the county of New Haven and State of Connecticut, have invented a new and useful Improvement in Ball-Joints, of which the following is a specification.

This invention relates generally to electric light fixtures and more particularly to the ball joint containing a portion of said fixtures.

The object of the invention is to provide a ball joint constructed in a novel manner whereby the cost of production is greatly reduced and a much neater, stronger and durable article produced.

Another object of the invention is to provide a ball joint embodying within its construction certain guard or protective features which prevent the wires passing therethrough from being cut during the manipulation or adjustment of the fixture at the ball joint.

With these and certain other objects in view, the invention consists in the novel features of construction, combination and arrangement of parts hereinafter fully described, and pointed out in the claims.

In the drawings forming a part of this specification: Figure 1 is a view of a fixture embodying a ball joint constructed in accordance with my invention. Fig. 2 is a similar view the ball and globe being adjusted to a different position. Fig. 3 is a sectional view of the ball joint showing the guards arranged therein. Fig. 4 is a detail perspective view of one of the sections with bushing or nipple. Fig. 5 is a perspective view of one of the guards detached.

In carrying out my invention I employ two hemispherical shells A and B which fit snugly together to produce a perfect sphere and are held locked together by means of a bolt C attached to one of the sections and passing through the opposite section to enter the winged nut D. Each section has a nipple or bushing connected thereto and through which the conductor wires pass. The nipple or bushing E is attached to the tubular arm of the fixture while the bushing or nipple F has the socket holder or other portion of the fixture connected thereto.

While I have shown this invention applied to a bracket fixture it will of course be understood that it can be, and is used upon chandelier fixtures and also upon what is known as portable lamps, and these fixtures have merely been shown for the purpose of illustrating the application of my invention but do not constitute any part thereof.

The hemispherical shells are connected to the bushings or nipples in a peculiar manner and it will also be noted that these bushings or nipples are especially constructed inasmuch as each is provided with a groove E' and F' which instead of being cut straight is cut upon the arc of a circle in both directions so as to receive the edge of the hemispherical shell and after this edge has been inserted the inner end of the bushing or nipple is swaged down firmly upon the contained portion of said shell thereby rigidly uniting the bushing and hemispherical section. One-half of the inner end of the bushing is of course cut-away to permit the opposing edge of the opposed hemispherical section to move freely in adjustment. By means of this special construction of bushing or nipple and the novel manner of uniting the hemispherical sections and bushings together, I provide an exceedingly neat, compact, durable and efficient form of ball joint and in connection therewith I employ guard plates G for the purpose of protecting the wires during the manipulation or adjustment of the parts of the ball joint and in Fig. 3 I have shown the manner of arranging these guard plates G there being two in number, one inserted in each bushing or nipple and bearing at its notched end G' upon the connecting bolt C, each guard plate G having laterally projecting wings or shoulders G² which engage the inner ends of the bushings or nipple and assist in the positioning of said guard plates. The inner ends of these guard plates are given a slight curve as shown at G³ and the curved end is also grooved slightly or convexed slightly so as to receive and position conductor wires which pass through the ball joint. These guard plates prevent the cutting of the wires and thereby greatly prolong the usefulness of the fixture embodying their construction.

It will be of course understood that whenever it is desired to adjust the portions of the fixtures it is only necessary to loosen the winged nut, adjust the sections of the ball joint to the desired point and then tighten up the nut.

A ball joint constructed as herein shown and described and embodying the guard or protective features will accomplish all of the useful objects and functions hereinbefore referred to.

What I claim is:—

1. A ball joint for fixtures comprising two hemispherical shells and means for connecting the same, each shell having a bushing or nipple connected thereto, and guard plates arranged within the hemispherical shells and projecting into the bushings or nipples for the purpose set forth.

2. A ball joint for fixtures comprising two hemispherical sections and means for connecting the same, each section having a bushing connected thereto, the inner end of each bushing being grooved to receive the spherical edge of a shell, as set forth.

3. A ball joint for fixtures comprising two hemispherical sections and means for connecting the same, each section having a bushing or nipple connected thereto, the inner portion of said bushing or nipple being grooved or cut-away in curved or spherical fashion and adapted to receive the spherical edge of the section, as set forth.

4. A ball joint for fixtures comprising two hemispherical sections and means for connecting the same, each section having a bushing or nipple connected thereto, the inner portion of said bushing or nipple being grooved or cut-away in curved or spherical fashion and adapted to receive the edge of a section, the inner end of said bushing or nipple being swaged down upon the contacting portion of the section, one-half of the inner end of bushing being cut-away to receive the opposed section, as set forth.

5. A ball joint for fixtures comprising two hemispherical sections, each section having a bushing or nipple connected thereto, a bolt for connecting said sections and guard plates notched at their inner ends and adapted to contact with the connecting bolt, the outer ends of said guard plates extending into the bushings or nipples as set forth.

6. A ball joint for fixtures comprising two hemispherical sections, each provided with a bushing or nipple, a bolt for connecting said sections, guard plates arranged within the sections their inner ends being notched and adapted to contact with the connecting bolt, their outer ends curved and adapted to enter the bushing or nipple, the intermediate portion having laterally projecting wings for the purpose specified.

LAURITZ W. ANDERSEN.

Witnesses:
DAVID A. WILLIAMS,
C. W. NORTHROP.